United States Patent [19]

Jeswani et al.

[11] 4,224,823
[45] Sep. 30, 1980

[54] FUEL SYSTEM FLOW PROCESS

[75] Inventors: Partab T. Jeswani; Gerard T. Ruflin, both of Rochester, N.Y.

[73] Assignee: General Motors Corporation, Detroit, Mich.

[21] Appl. No.: 12,355

[22] Filed: Feb. 15, 1979

[51] Int. Cl.³ .......................................... G01M 19/00
[52] U.S. Cl. ........................................ 73/118; 73/113
[58] Field of Search .................. 73/118, 113, 3, 194 R

[56] References Cited

U.S. PATENT DOCUMENTS

| | | | |
|---|---|---|---|
| 3,469,442 | 9/1969 | Brueckner | 73/118 |
| 3,584,506 | 6/1971 | Smatko | 73/113 X |

*Primary Examiner*—Jerry W. Myracle
*Attorney, Agent, or Firm*—C. K. Veenstra

[57] ABSTRACT

A de-aerated aqueous solution having a short foam decay period is employed as a test fluid in a fuel system flow process. To minimize corrosion after testing, the solution is removed from the fuel system by applying subatmospheric pressure to the fuel system and by flowing air through the fuel system.

6 Claims, 4 Drawing Figures

FUEL SYSTEM FLOW PROCESS

TECHNICAL FIELD

This invention relates to a fuel system flow process employing a water-based test fluid.

BACKGROUND

Current practice in automotive carburetor testing processes requires that a carefully controlled blend of gasoline or other solvents be flowed through the carburetor fuel system to measure and adjust the carburetor fuel flow characteristics. In the quest for an alternative to the use of gasoline or other solvents in these processes, ordinary tap water was used as a test fluid. However, the water did not provide repeatable test data, apparently because its high surface tension does not permit adequate wetting of the various surfaces in the carburetor fuel system.

Thereafter, as set forth in U.S. Pat. No. 3,584,506 issued June 15, 1971 in the name of J. S. Smatko, aqueous solutions of several different wetting agents, having surface tension values substantially below that of water, were tested. Those tests indicated that solutions with high foaming tendencies also produce non-repeatable test data. However, solutions were found which did provide repeatable data, and as a result, it was concluded that a water-based test fluid suitable for use in a fuel system flow process should be characterized by a tendency to produce a foam height less than about 35 mm on the Dynamic Foam Tester.

SUMMARY OF THE INVENTION

This invention provides a fuel system flow process employing a water-based test fluid characterized by other important attributes.

We have found, for example, that the foam height produced by a water-based test fluid is an indication only of its tendency to produce foam, and not of the tenacity or stability of its foam, whereas the decay period of the foam produced by a water-based test fluid is a more accurate indication of its suitability for use in a fuel system flow process.

Thus a fuel system flow process according to one aspect of this invention employs a water-based test fluid having an unstable foam which decays in a period on the order of about 10 seconds from the stabilized foam height generated during aeration of about 46 cc of the fluid with an air flow of about 397 cc/minute. In contrast, an aqueous solution of 0.1% "Pluronic L61", which produced the most promising results set forth in U.S. Pat. No. 3,584,506, has a foam decay period of 395 seconds.

In addition, we have found that air, which becomes entrained in a water-based test fluid when a wetting agent is mixed with water, contributes to flow instabilities and that a de-aerated water-based test fluid provides more repeatable data in a fuel system flow process.

Thus in a fuel system flow process according to another aspect of this invention, a wetting agent is mixed with water to form a test fluid, and the test fluid is then de-aerated before delivery through the fuel system.

We have also found that a fuel system which has been tested with a water-based fluid is subject to corrosion, even though the fluid may have contained a corrosion inhibitor, and that corrosion may be minimized if the test fluid is removed from the fuel system by applying subatmospheric pressure to the fuel system and/or by flowing air through the fuel system.

Thus in a fuel system flow process according to another aspect of this invention, the fuel system is tested with a water-based test fluid which is thereafter removed by applying subatmospheric pressure to the fuel system and/or by flowing air through the fuel system.

The details as well as other features and advantages of this invention are set forth in the remainder of the specification and are shown in the accompanying drawings.

BEST MODE FOR CARRYING OUT THE INVENTION

Figure 1:
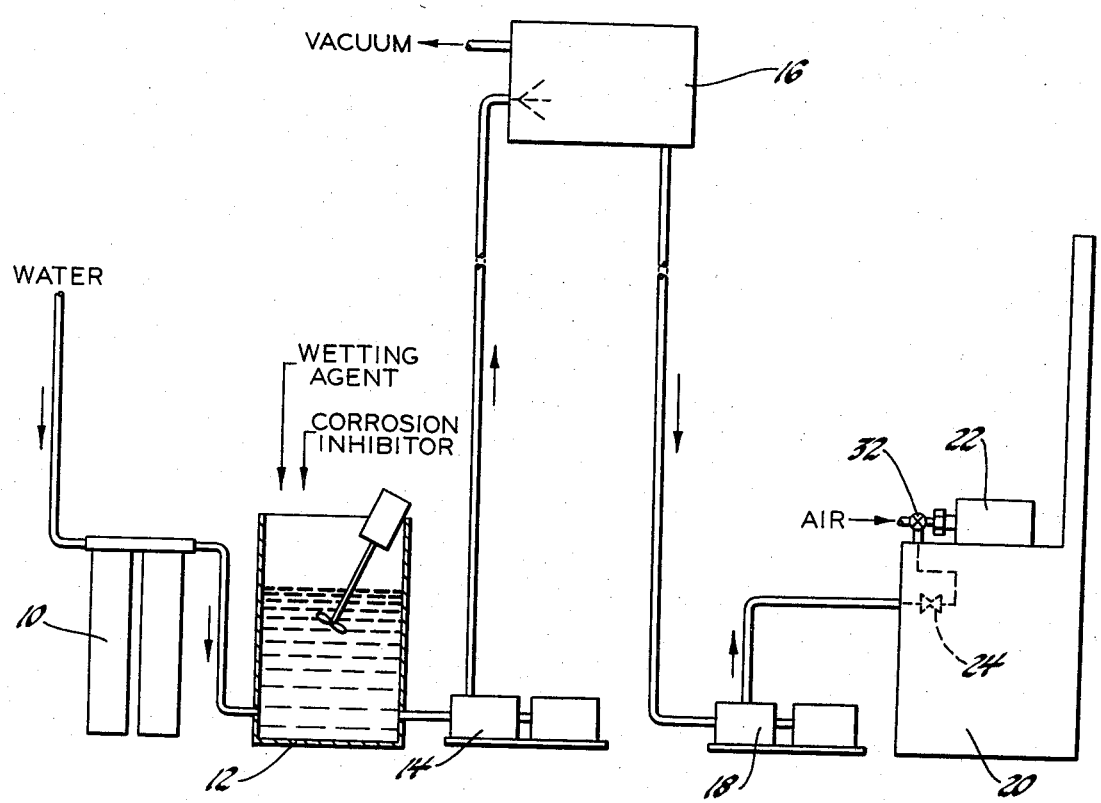
FIG. 1 is a schematic view of fuel system test apparatus operating according to this invention.

Referring first to FIG. 1, tap water is delivered through a de-ionizer 10 to a mixing tank 12. A wetting agent and a corrosion inhibitor are added to tank 12 and mixed with the water to form a test fluid. A pump 14 then delivers the test fluid to a de-aeration tank 16.

Vacuum is applied to tank 16 to de-aerate the test fluid. The air content of the test fluid may be measured with a dissolved oxygen meter, and we have found that more repeatable data is obtained when the test fluid is de-aerated from an oxygen content of 8 parts per million to an oxygen content of about 1 ppm.

A pump 18 delivers the de-aerated test fluid from tank 16 through a flow stand 20 to a carburetor or other fuel system 22 to be tested. Flow stand 20 contains conventional means for drawing air at selected rates through the carburetor, and the carburetor fuel system meters the test fluid in its own particular manner for mixture with the air. The carburetor accepts test fluid only at the rate at which it meters the test fluid, and the flow stand accordingly includes means 24 for measuring the rate at which test fluid flows through the flow stand to the carburetor to thereby measure the test fluid (and thus the fuel) metered by the carburetor.

To provide data comparable to the data provided by conventional test fluids, such as Salvasol or Stoddard solvent, we believe the surface tension of a water-based test fluid should be below 35 dynes/cm, and if possible below 30 dynes/cm, at 25° C.; the surface tension of Stoddard solvent is 24.0 dynes/cm at 25° C. We also believe the viscosity of a water-based test fluid should be below 1.000 cp at 25° C.; the viscosity of Stoddard solvent is 0.997 cp at 25° C.

We further believe that a water-based test fluid must have a low foaming tendency and that any foam produced must be unstable and decay rapidly. A sensitive method we use for testing this attribute is to inject air at a rate of 397 cc/minute into a beaker containing 46 cc of the solution until the foam height stabilizes; the air is then stopped and the period required for the foam to decay or completely disappear is measured. We believe the foam decay period should be on the order of about 10 seconds; the foam decay period for Stoddard solvent is 8 seconds.

The prior solution of de-ionized water containing 0.1% "Pluronic L61" does not meet such criteria—its surface tension is 37 dynes/cm at 25° C. and its foam decay period is 395 seconds.

However, these criteria are met by de-ionized water containing 0.2% by volume "Surfynol 440", a wetting agent available from Air Products and Chemicals, Inc. and said to be made by reacting ethylene glycol with the acetylenic glycol 2,4,7,9-tetramethyl-5-decyne-4,7-diol:

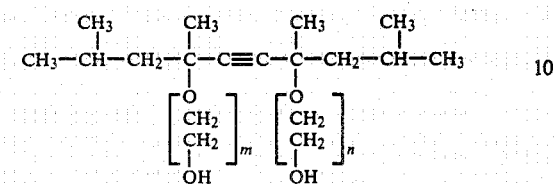

where $m+n=3.5$, the number of moles of ethylene oxide, and also containing 300 ppm "Formet 394", a corrosion inhibitor available from The Perolin Company, Inc. and said to contain polyacrylomide with mercaptobenotriazole. The surface tension of this solution is 32.2 dynes/cm at 25° C., its viscosity is 0.998 cp at 25° C., and its foam decay period is 10 seconds.

It is noted that "Surfynol 440" is not completely soluble at a concentration of 0.2%, but the excess wetting agent is believed to assist in achieving the brief foam decay period. A variety of other corrosion inhibitors, such as those containing sodium silicate, may be used with "Surfynol 440" to provide a solution meeting these criteria, and other wetting agents may also be used to provide a solution meeting these criteria.

To test a water-based test fluid having such attributes, five master carburetors were audited on a flow stand using Salvasol solvent as the test fluid. The solvent flow rate at idle, part throttle and wide open throttle air flows was measured (in pounds/minute) for each and established as the specification. Three test carburetors similar to each master were then audited repeatedly at those air flows using both Salvasol solvent and a solution of de-ionized water containing 0.2% "Surfynol 440" and 300 ppm "Formet 394" as test fluids, and the spread or difference between the highest and lowest test fluid flow rates was recorded (as a % of the specification). The results are set forth in Table I, from which it may be seen that the water-based test fluid provides data with repeatability approaching that of the solvent. It is noted that in these tests, the water-based test fluid was pumped directly from mixing tank 12 to the flow stand, bypassing de-aeration tank 16.

Thereafter, six test carburetors were audited 10 times with a de-aerated solution of de-ionized water containing 0.2% "Surfynol 440" and 300 ppm "Formet 394" as a water-based test fluid. The average test fluid flow rate (in pounds/minute) for idle, part throttle and wide open throttle air flows and the spread or difference between the highest and lowest test fluid flow rates (expressed as a % of the average) are set forth in Table II. It may be seen that the mean spread achieved with the de-aerated water-based test fluid is even lower than before, although this difference may be attributable in part to the different in test carburetors.

TABLE II

| Carb | IDLE Average | Spread | PART THROTTLE Average | Spread | WIDE OPEN THROTTLE Average | Spread |
|---|---|---|---|---|---|---|
| F-1 | .0697 | 1.4 | .1927 | 0.7 | 1.0166 | 0.8 |
| F-2 | .0707 | 1.0 | .2047 | 0.9 | 1.0658 | 0.9 |
| F-3 | .0722 | 1.3 | .1949 | 0.4 | 1.0444 | 3.7 |
| F-4 | .0723 | 1.1 | .1932 | 0.9 | 1.0306 | 1.6 |
| F-5 | .0455 | 0.9 | .1949 | 0.8 | 1.0390 | 0.4 |
| F-6 | .0703 | 1.7 | .1935 | 0.6 | 1.0369 | 0.5 |

Flow stands such as 20 are used primarily to match the fuel flow of a test carburetor with the fuel flow of a master carburetor. To that end, the master carburetor is tested on the flow stand at various air flows and its test fluid flow is recorded. The test carburetor is then tested at those air flows and adjusted to provide the same test fluid flow.

To determine whether carburetors may be adjusted using a water-based test fluid instead of a solvent, a master carburetor was audited on a flow stand using Stoddard solvent as the test fluid, and the solvent flow rate at idle and part throttle air flows was measured (in pounds/minute) and established as the specification. The master carburetor was then audited on a second flow stand using a de-aerated solution of de-ionized water containing 0.2% "Surfynol 440" and 300 ppm "Formet 394" as a water-based test fluid, and the solution flow rate at the same air flows was measured. Five test carburetors were then flowed on the second test stand at the same air flows using the water-based test fluid and adjusted to provide the same solution flow rate as the master. The test carburetors were then audited on the first flow stand using Stoddard solvent as the test fluid, and the solvent flow rate was measured at the idle and part throttle air flows; Table III shows the specification and the deviation of each test carburetor from the specification (expressed as a % of the specification). It may be seen that carburetors adjusted using

TABLE I

| | IDLE | | | PART THROTTLE | | | WIDE OPEN THROTTLE | | |
|---|---|---|---|---|---|---|---|---|---|
| | | Spread | | | Spread | | | Spread | |
| Carb | Spec | Solvent | Solution | Spec | Solvent | Solution | Spec | Solvent | Solution |
| A-1 | .0776 | 0.84 | 0.84 | .2275 | 0.45 | 1.27 | .8193 | 5.29 | 0.59 |
| A-2 | " | 0.71 | 1.06 | " | 0.56 | 0.73 | " | 1.56 | 1.37 |
| A-3 | " | 1.08 | 0.24 | " | 0.67 | 0.61 | " | 2.24 | 1.76 |
| B-1 | .0850 | 0.59 | 1.97 | .3309 | 1.45 | 1.01 | .8464 | 1.85 | 0.99 |
| B-2 | " | 0.47 | 1.65 | " | 0.49 | 1.04 | " | 3.06 | 1.96 |
| B-3 | " | 0.96 | 1.64 | " | 0.91 | 0.76 | " | 1.04 | 1.71 |
| C-1 | .1152 | 0.30 | 0.97 | .3345 | 0.92 | 0.65 | .7903 | 3.88 | 1.35 |
| C-2 | " | 0.33 | 4.02 | " | 0.39 | 1.66 | " | 1.05 | 2.54 |
| C-3 | " | 0.43 | 1.96 | " | 0.71 | 0.70 | " | 1.45 | 1.47 |
| D-1 | .0737 | 0.88 | 1.32 | .3611 | 0.88 | 1.12 | .8005 | 2.06 | 1.27 |
| D-2 | " | 2.86 | 1.89 | " | 0.52 | 1.32 | " | 1.20 | 1.27 |
| D-3 | " | 3.31 | 3.01 | " | 0.71 | 0.62 | " | 1.34 | 1.22 |
| E-1 | .0540 | 1.51 | 10.81 | .2300 | 1.16 | 2.38 | .8896 | 0.72 | 2.22 |
| E-2 | " | 5.04 | 4.23 | " | 2.77 | 0.70 | " | 1.66 | 2.21 |
| E-3 | " | 2.20 | 1.63 | " | 0.56 | 0.52 | " | 14.01 | 0.89 | the water-based test fluid provide flow rates very close to the specification.

TABLE III

| Carb | IDLE | | PART THROTTLE | |
|---|---|---|---|---|
| | Spec | Deviation | Spec | Deviation |
| G-1 | .0591 | −0.85 | .1831 | −1.04 |
| G-2 | " | +1.86 | " | −1.37 |
| G-3 | " | +0.34 | " | −1.26 |
| G-4 | " | +0.17 | " | −0.87 |
| G-5 | " | +0.51 | " | −1.91 |

To compare carburetors adjusted using a water-based test fluid with carburetors adjusted using Stoddard solvent, two master carburetors were audited on a flow stand using Stoddard solvent as the test fluid, and the solvent flow rate at idle and part throttle air flows was measured (in pounds/minute) and established as the specification. The master carburetors were then audited on a second flow stand using a de-aerated solution of de-ionized water containing 0.2% "Surfynol 440" and 300 ppm "Formet 394" as a water-based test fluid, and the solution flow rate at the same air flows was measured. Four test carburetors similar to each master were then flowed on a third test stand at the same air flows using Stoddard solvent and adjusted to provide the same solvent flow rate as the master. The test carburetors were then audited on a fourth flow stand with Stoddard solvent and the deviation of each from the specification was recorded (as a % of the specification). The adjustments of the test carburetors were then upset, and the test carburetors were flowed on the second test stand at the same air flows using the water-based test fluid and adjusted to provide the same solution flow rate as the master. The test carburetors were then audited on the fourth flow stand with Stoddard solvent and the deviation of each from the specification was recorded (as a % of the specification). The results are set forth in Table IV, and it may be seen that the water-based test fluid provides results very comparable to Stoddard solvent.

TABLE IV

| Carb | IDLE | | | PART THROTTLE | | |
|---|---|---|---|---|---|---|
| | | Deviation | | | Deviation | |
| | Spec | Solvent | Solution | Spec | Solvent | Solution |
| H-1 | .0364 | −7.97 | −0.82 | .1856 | +3.61 | 0 |
| H-2 | " | +1.37 | −1.10 | " | +0.81 | +0.05 |
| H-3 | " | +1.10 | −2.20 | " | +0.43 | 0 |
| H-4 | " | +0.55 | 0 | " | −0.38 | −0.48 |
| J-1 | .0286 | +1.40 | +2.10 | .1423 | +1.05 | +2.95 |
| J-2 | " | +1.75 | 0 | " | +0.98 | +0.98 |
| J-3 | " | +0.70 | −1.05 | " | +1.34 | +1.12 |
| J-4 | " | +2.45 | +8.74 | " | +0.63 | +1.12 |

Figure 2:
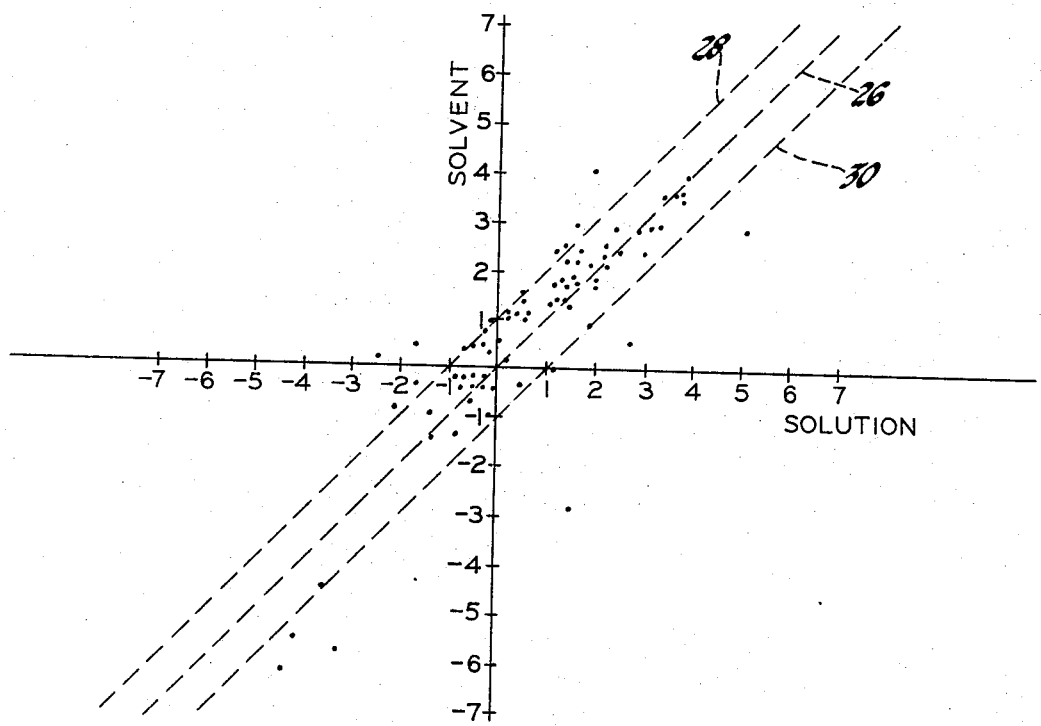
FIGS. 2, 3 and 4 are data plots showing results achieved with this invention.
Figure 3:
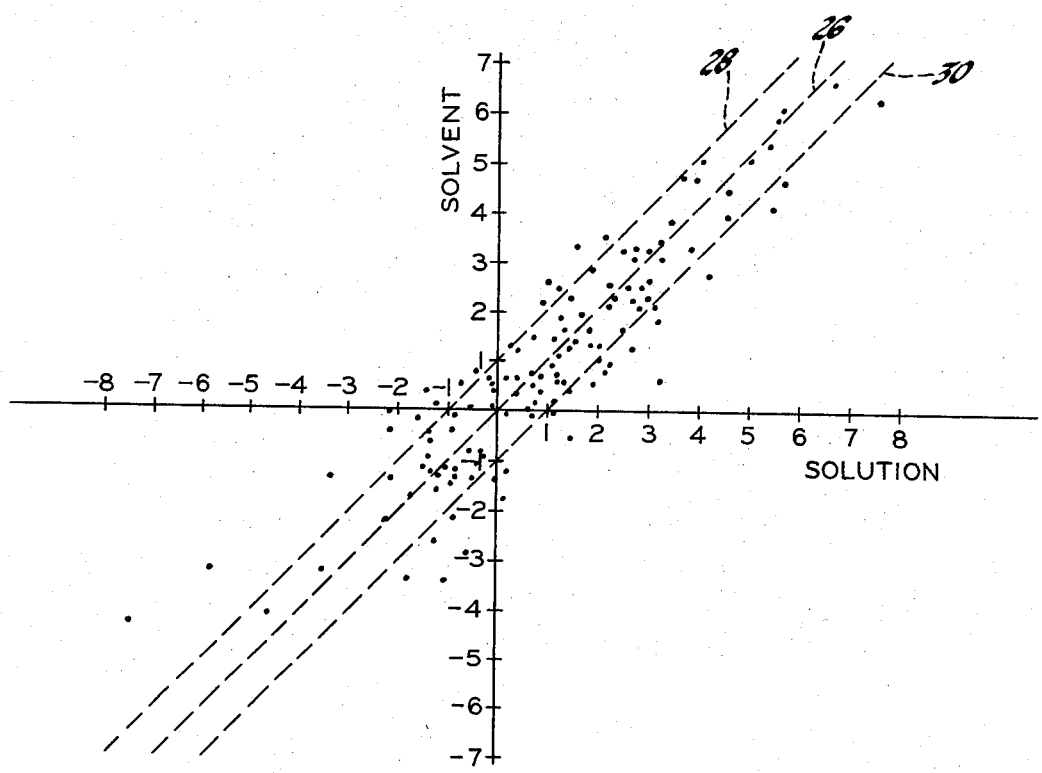
Figure 4:
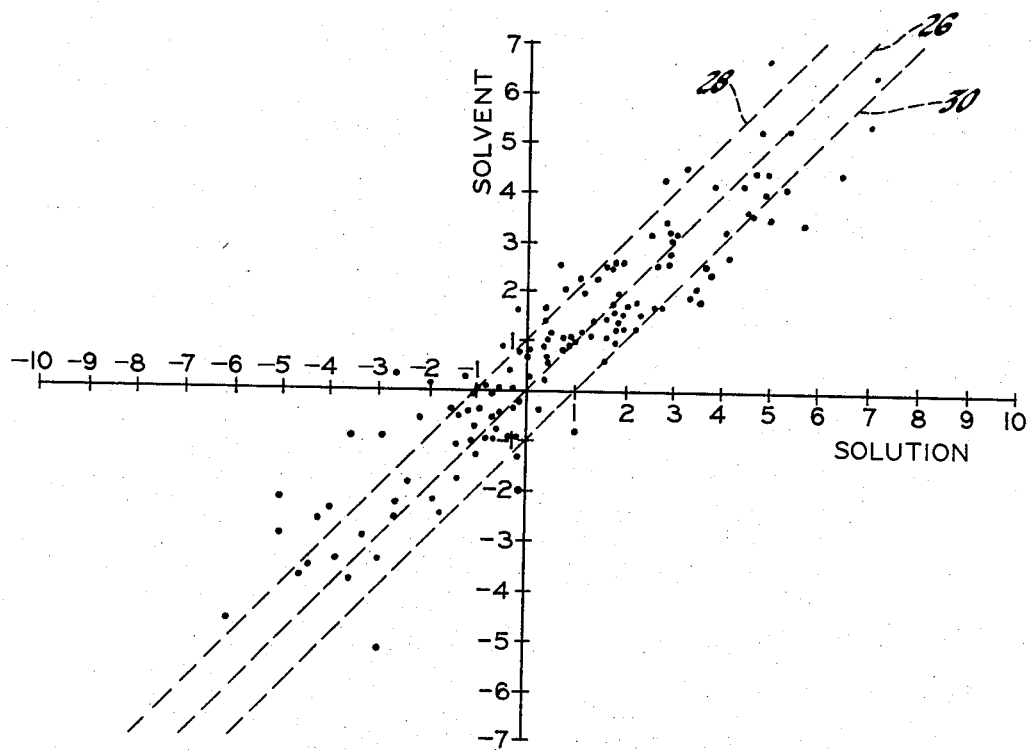

To provide a broader comparison between the results achieved with water-based test fluid and the results achieved with Stoddard solvent, master carburetors of three different models were audited at five different air flows using Stoddard solvent and a de-aerated solution of de-ionized water containing 0.2% "Surfynol 440" and 300 ppm "Formet 394" as test fluids. Test carburetors adjusted to the master specification using Stoddard solvent were then audited at those air flows using Stoddard solvent and the water-based test fluid and the deviation of each test carburetor flow rate from the corresponding master carburetor flow rate was recorded. FIGS. 2, 3 and 4 show, each for one of the models, the deviation of a particular test carburetor at a particular air flow using Stoddard solvent (on the vertical axis) plotted against the corresponding deviation using the water-based test fluid (on the horizontal axis). Theoretically, the points should fall on a 45° line 26. The lines 28 and 30 represent a ±1% band which covers the range of non-repeatability that would be expected, and it may be seen that most points fall inside that band. Certain of the points which do not fall inside the band probably occur as the carburetor is in the transition from the idle portion of its fuel system to the main portion of its fuel system, a time when the least repeatable data would be expected. Thus it may be seen that results with water-based test fluid are very comparable to results with Stoddard solvent.

From the foregoing it will be appreciated that important characteristics of water-based test fluids for fuel system flow processes have been discovered.

Even though the water-based test fluid may contain a corrosion inhibitor, some corrosion may be experienced if the test fluid remains in the carburetor. To minimize such corrosion, we have provided a valve 32 to shut off the flow of test fluid from flow stand 20 to the carburetor. The flow stand is operated to draw air through the carburetor, and a plate (not shown) is placed over the carburetor to prevent air flow through the carburetor; as a result, subatmospheric pressure is applied to the carburetor and draws the solution from the carburetor fuel system. Thereafter, valve 32 is moved to connect a source of pressurized air to the carburetor, and air flows through the carburetor fuel system to purge any remaining solution from the carburetor.

The embodiments of the invention in which an exclusive property or privilege is claimed are defined as follows:

1. The process of determining the rate of flow of fuel which can be provided through a fuel system, said process including the steps of:
   delivering through said fuel system an aqueous solution having an unstable foam which decays in a period on the order of about 10 seconds from the stabilized foam height generated during aeration of about 46 cc of solution with an air flow of about 397 cc/minute,
   and measuring the rate of flow of the solution through said fuel system.

2. The process of determining the rate of flow of fuel which can be provided through a fuel system, said process including the steps of:
   delivering through said fuel system an aqueous solution having a surface tension less than about 35 dynes/cm at 25° C., a viscosity less than about 1.000 cp at 25° C., and an unstable foam which decays in a period on the order of about 10 seconds from the stabilized foam height generated during aeration of about 46 cc of solution with an air flow of about 397 cc/minute,
   and measuring the rate of flow of the solution through said fuel system.

3. The process of determining the rate of flow of fuel which can be provided through a fuel system, said process including the steps of:
   delivering through said fuel system an aqueous solution containing acetylene glycol reacted with ethylene oxide,
   and measuring the rate of flow of the solution through said fuel system.

4. The process of determining the rate of flow of fuel which can be provided through a fuel system, said process including the steps of:
   mixing a wetting agent with water to form a solution,
   delivering the solution to a de-aeration tank and applying vacuum to said tank to provide a de-aerated solution having a dissolved oxygen content of about 1 ppm,
   delivering the de-aerated solution through said fuel system,
   and measuring the rate of flow of the de-aerated solution through said fuel system.

5. The process of determining the rate of flow of fuel which can be provided through a fuel system, said process including the steps of:
   delivering an aqueous solution through said fuel system,
   measuring the rate of flow of the solution through said fuel system,
   and applying subatmospheric pressure to said fuel system to withdraw the solution from, and thereby minimize corrosion of, said fuel system.

6. The process of determining the rate of flow of fuel which can be provided through a fuel system, said process comprising the steps of:
   mixing a corrosion inhibitor containing polyacrylomide with mercaptobenotriazole, a wetting agent containing acetylene glycol reacted with ethylene oxide, and de-ionized water to form a solution having a surface tension of about 32.2 dynes/cm at 25° C., a viscosity of about 0.998 cp at 25° C., and an unstable foam which decays in about 10 seconds from the stabilized foam height generated during aeration of about 46 cc of solution with an air flow of about 397 cc/minute,
   delivering the solution to a de-aeration tank and applying vacuum to said tank to de-aerate the solution,
   delivering the de-aerated solution through said fuel system and measuring its rate of flow therethrough,
   applying subatmospheric pressure to said fuel system to withdraw the solution from said fuel system,
   and flowing air through said fuel system to further remove the solution from said fuel system.

* * * * *